(12) United States Patent
Özer et al.

(10) Patent No.: US 7,895,469 B2
(45) Date of Patent: Feb. 22, 2011

(54) INTEGRATED CIRCUIT USING SPECULATIVE EXECUTION

(75) Inventors: Emre Özer, Cambridge (GB); David Michael Bull, Balsham (GB); Shidhartha Das, Cambridge (GB)

(73) Assignee: ARM Limited, Cambridge (GB)

( * ) Notice: Subject to any disclaimer, the term of this patent is extended or adjusted under 35 U.S.C. 154(b) by 305 days.

(21) Appl. No.: 12/285,796

(22) Filed: Oct. 14, 2008

(65) Prior Publication Data

US 2009/0106616 A1  Apr. 23, 2009

(30) Foreign Application Priority Data

Oct. 17, 2007 (GB) .................... 0720331.8

(51) Int. Cl.
  *G06F 11/00* (2006.01)
(52) U.S. Cl. .......................... 714/10; 714/3
(58) Field of Classification Search ............ 714/2, 714/10, 21
See application file for complete search history.

(56) References Cited

U.S. PATENT DOCUMENTS

| 6,854,075 | B2 * | 2/2005 | Mukherjee et al. ............ 714/51 |
| 7,337,356 | B2 * | 2/2008 | Mudge et al. ................. 714/10 |
| 7,409,589 | B2 * | 8/2008 | Mack et al. ................... 714/15 |
| 2003/0188124 | A1 * | 10/2003 | Luick ........................ 711/214 |
| 2008/0168305 | A1 * | 7/2008 | Gschwind et al. ............. 714/10 |
| 2008/0250271 | A1 * | 10/2008 | Ozer et al. ................... 714/15 |
| 2010/0058107 | A1 * | 3/2010 | Blaauw et al. ................ 714/2 |
| 2010/0251046 | A1 * | 9/2010 | Mizuno et al. .............. 714/726 |

* cited by examiner

*Primary Examiner*—Marc Duncan
(74) *Attorney, Agent, or Firm*—Nixon & Vanderhye P.C.

(57) ABSTRACT

An integrated circuit 2 is provided with a plurality of pipeline stages 10. These pipeline stages 10 have speculative processing control circuitry 12 which permits speculative processing in downstream pipeline stages and triggers a first error recovery operation (partial pipeline flushing) if such speculative processing is determined to be based upon an error. The pipeline stage 10 further includes speculative error detecting circuitry 14 which generates a prediction nc regarding whether or not the processing circuitry 18 will produce an error. This prediction is used to trigger a second error recovery operation (partial pipeline stall). This second error recovery operation has a lower performance penalty than the first error recovery operation.

33 Claims, 4 Drawing Sheets

INTEGRATED CIRCUIT USING SPECULATIVE EXECUTION

This application claims priority to Great Britain Application No. 0720331.8 filed 17 Oct. 2007, the entire contents of which are hereby incorporated by reference.

BACKGROUND OF THE INVENTION

1. Field of the Invention

This invention relates to the field of integrated circuits. More particularly, this invention relates to integrated circuits which use speculative execution techniques whereby output signals of processing circuitry within the integrated circuit are used for further processing speculating that the values used are correct and, if it is subsequently determined that they are not correct, then error recovery operations are used to repair the errors.

2. Description of the Prior Art

It is known to provide integrated circuits using speculative execution techniques. PCT Published Patent Application No. WO-A-2004/084072 describes an integrated circuit including pipeline stages incorporating so called "Razor" latches which capture the output from a processing stage and pass this to a next processing stage at the end of one clock cycle and then subsequently evaluate whether or not the signals captured and passed forward were correct. The processing performed based upon the signals passed to the next pipeline stage is speculative in the sense that it proceeds based upon an assumption that the signals are correct. If it is determined that the signals are incorrect, then an error recovery operation is initiated. The use of these techniques allows, among other advantages, lower operating voltages and/or higher operating speeds to be achieved with less power consumption since the integrated circuit can be operated closer to the limit of failure and when errors do occur then they can be detected and repaired.

Whilst the above techniques do produce significant improvements in the performance of an integrated circuit, the need to recover from erroneous operation nevertheless inflicts a performance penalty which it would be desirable to reduce. This performance penalty is greater in the case of high performance processors using deeply pipelined processing arrangements since the pipeline flushes that are typically used as part of error recovery involves the flushing of deep pipelines which take many processing cycles to refill. Measures which can reduce the performance penalty associated with the speculative processing within such systems are advantageous.

SUMMARY OF THE INVENTION

Viewed from one aspect the present invention provides an integrated circuit comprising:

processing circuitry responsive to one or more input signal values to generate an output signal in dependence thereupon;

speculative processing control circuitry coupled to said processing circuitry and configured to permit speculative processing based upon a value of said output prior to confirmation that said value is correct, subsequently to generate a determination of whether said value is incorrect and, if said determination indicates that said value has been determined to be incorrect, then to initiate a first error recovery operation; and speculative error prediction circuitry coupled to said processing circuitry to generate a prediction of whether said value is incorrect prior to generation of said determination by said speculative processing control circuitry and, if said prediction indicates that said value is predicted to be incorrect, then to initiate a second error recovery operation, said second error recovery operation having a lesser performance penalty than said first error recovery operation.

The present technique recognizes that the speculative processing control circuitry associated with these types of integrated circuits makes an accurate determination of whether or not an error has occurred after some processing has already occurred based upon that error. As a consequence of this, the error recovery operation associated with the accurate determination of the occurrence of an error tends to have a high performance penalty. The present technique proposes the addition of speculative error prediction circuitry which serves to generate a prediction of whether or not an error will occur with this prediction being available earlier than the determination of whether or not an error has occurred which is made by the speculative processing control circuitry. The prediction generated by the speculative error prediction circuitry need not be guaranteed to be accurate and this, in a broad sense, makes it possible to generate this prediction earlier than the time at which the determination is generated. The prediction which is generated earlier in this way is used to trigger a second error recovery operation. Since this second error recovery operation can be triggered earlier, it can have a different form to the first error recovery operation and can have a lesser performance penalty than the first error recovery operation. It will be appreciated that since the prediction which is generated is not guaranteed to be accurate, there will arise some false positives whereby an error is predicted, but in practice does not occur. In these cases an unnecessary second error recovery operation will have been triggered. Nevertheless, the reduction in the performance penalty which is achieved by predicting errors which are genuine and allowing the second error recovery operation with its lesser performance penalty to be used to correct those errors produces an overall advantage and reduces the performance penalty associated with errors in this type of system. At a broad level, the present technique adds a second level of speculation to the system such that it includes speculative error prediction as well as permitting speculative processing. These two levels of speculation interact synergistically and permit the higher level of performance associated with speculative processing to be achieved with reduced performance penalties when errors arise that require recovery operations to be performed.

Whilst it will be appreciated that the present techniques can be employed within processing circuitry having a wide variety of different forms, it is particularly well suited to processing circuitry which comprises a plurality of pipeline stages.

Within the context of systems including a plurality of pipeline stages, the first error recovery operation may comprise an at least partial flush of the plurality of pipeline stages. In this way, signals generated in dependence upon those values which are incorrect can be flushed from the system. Whilst effective, this first error recovery operation has a significant performance penalty. This performance penalty can be reduced by flushing those pipelined stages upstream and including the erring pipeline stages that is generating the incorrect value whilst allowing downstream pipeline stages, excluding any which have actually acted upon the value in error (which would also be flushed), to continue their processing and generate valid results.

The second error recovery operation may be performed in a variety of different ways including stalling those pipeline stages upstream of an erring pipeline stage that is generating the value that is incorrect so as to permit correction of that value within the erring pipeline stage. Predicting that a pipeline stage will produce an error before the signal values have advanced along the pipeline permits the upstream portion of the pipeline to be stalled and allows time for the correct processing to be achieved without requiring a pipeline flush. This second error recovery operation thus incurs a significantly reduced performance penalty compared with the first error recovery operation.

Whilst the present techniques could be used within asynchronous processing circuits, they are well suited to systems in which a clock signal is used to synchronize operation of different portions of the processing circuitry. The control of processing operations relative to this clock signal and the timing of controls relative to this clock signal is well suited to the techniques of speculative processing and speculative error detection.

Some embodiments of the present technique include at least one pipeline stage comprising said processing circuitry; an output sequential storage element coupled to said processing circuitry and responsive to said clock signal to capture said value of said output signal generated by said processing circuitry at a first time and to pass said value as an input signal to one or more following pipeline stages; wherein said speculative processing control circuitry is coupled to said sequential storage element to generate said determination at a second time that is later than said first and is responsive to said determination indicating that said value is incorrect to trigger said first error recovery operation to repair incorrect further processing in said plurality of pipeline stages based upon said value that is determined as incorrect; and said speculative error detecting circuitry is responsive to one or more signals within said processing stage to generate said prediction at a third time that is before said first time and is responsive to said prediction indicating that said value will be incorrect to trigger said second error recovery operation to prevent further processing in said plurality of pipeline stages based upon said value that is predicted to be incorrect.

It will be appreciated that the second error recovery operation may be achieved in a variety of different ways. One embodiment uses an input-holding sequential storage element coupled to said one or more input signals and responsive to the prediction indicating that the value will be incorrect to store the one or more input signals such that the input holding sequential storage element can apply said one or more input signals to the processing logic during the second error correction operation.

The use of the signals from this input-holding sequential storage element can be selected with a multiplexer switched in dependence upon the prediction.

The power consumption associated with the input-holding sequential storage element can be reduced by arranging that it is not triggered to store the input signals unless the prediction indicates that the value will be incorrect.

It will be appreciated that the speculative processing control and the first error recovery operation could be achieved in a variety of different ways. One way of achieving this is to use a shadow sequential storage element coupled to the processing logic and triggered to store a correct value of the output signal at the second time, values within the output sequential storage element and the shadow sequential storage element being compared in order to make the determination of whether or not an error has occurred.

The shadow sequential storage element can be used to reload the correct value of the output signal into the output sequential storage element as part of the second error recovery operation and/or the first error recovery operation.

The speculative error prediction circuitry can be advantageously combined with voltage steering circuitry coupled to the processing circuitry and responsive to the predictions made to steer a metastable value to either a logic "1" or a logic "0" value. The voltage steering circuitry perform a reinterpretation of the signal value so that the signal can be one of the proper logic values.

Whilst the present techniques could be used within a system having static operational parameters so as to provide increased robustness against errors, the technique is well suited to systems where one or more operational parameters, such as an operating voltage and/or an operating frequency, are varied in dependence upon at least one of the determination and the prediction. This dynamic control of the operational parameters allows the integrated circuit to operate closer to the point of failure in a manner which significantly improves the overall performance of the integrated circuit.

Viewed from another aspect the present technique provides a method of operating an integrated circuit, said method comprising the steps of:

in response to one or more input signal values generating with processing circuitry an output signal in dependence thereupon;

performing speculative processing control of said processing circuitry to permit speculative processing based upon a value of said output prior to confirmation that said value is correct, subsequently to generate a determination of whether said value is incorrect and, if said determination indicates that said value has been determined to be incorrect, then to initiate a first error recovery operation; and performing speculative error prediction for said processing circuitry to generate a prediction of whether said value is incorrect prior to generation of said determination by said speculative processing control circuitry and, if said prediction indicates that said value is predicted to be incorrect, then to initiate a second error recovery operation, said second error recovery operation having a lesser performance penalty than said first error recovery operation.

Viewed from a further aspect the present invention provides an integrated circuit comprising:

processing means for generating an output signal in dependence upon one or more input signal values;

speculative processing control means coupled to said processing circuitry for permitting speculative processing based upon a value of said output prior to confirmation that said value is correct, subsequently for generating a determination of whether said value is incorrect and, if said determination indicates that said value has been determined to be incorrect, then for initiating a first error recovery operation; and speculative error prediction means coupled to said processing circuitry for generating a prediction of whether said value is incorrect prior to generation of said determination by said speculative processing control circuitry and, if said prediction indicates that said value is predicted to be incorrect, then for initiating a second error recovery operation, said second error recovery operation having a lesser performance penalty than said first error recovery operation.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
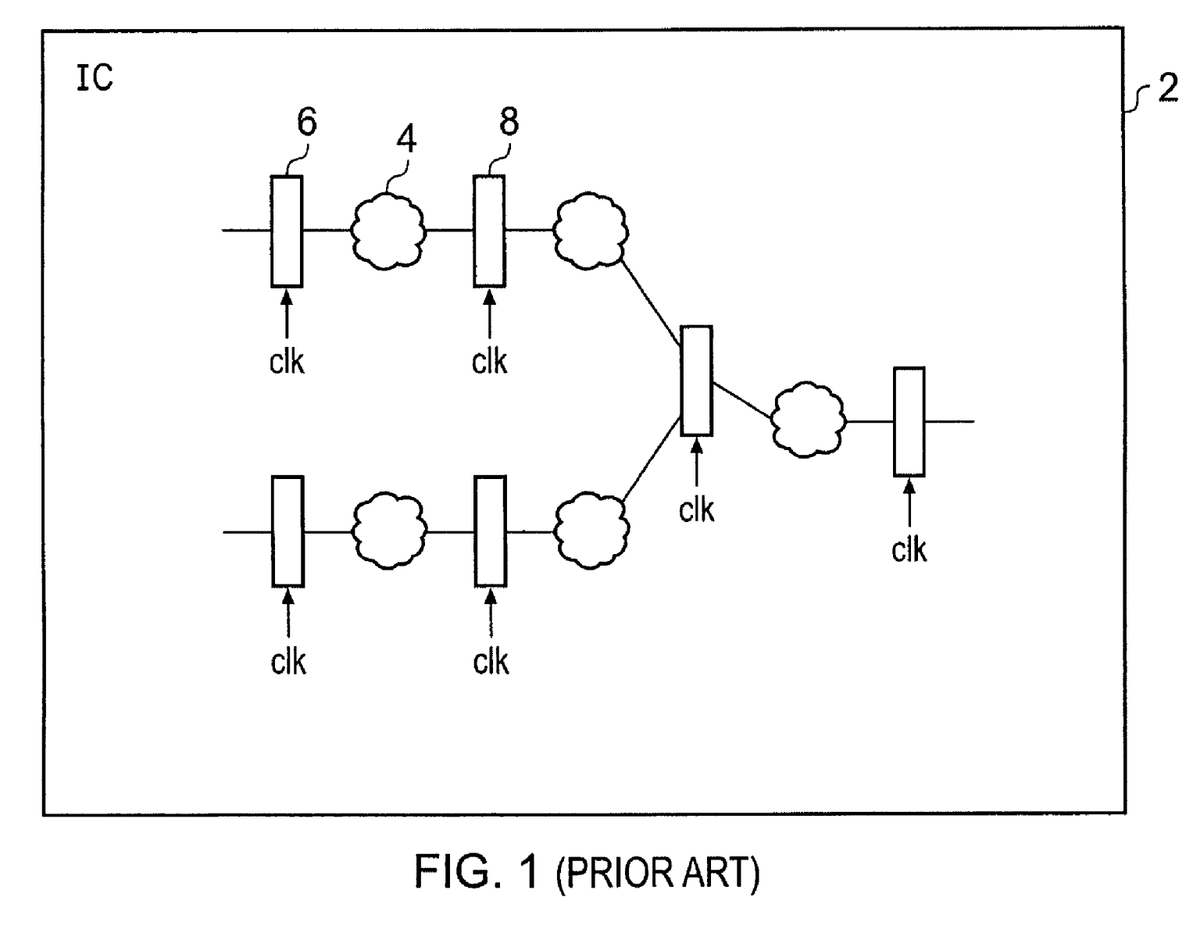
FIG. 1 schematically illustrates an integrated circuit incorporating processing circuitry in the form of a plurality of pipeline stages.

FIG. 1 illustrates an integrated circuit 2 including a plurality of processing pipeline stages each formed of some processing circuitry 4 with an associated input signal latch 6 and an associated output signal latch 8. It will be appreciated that the input signal latch 6 and the output signal latch 8 could be any form of sequential storage element (e.g. latch, flip-flop, ... etc) and in the following description the reader will understand that any form of sequential storage element could be used. As illustrated in FIG. 1, the latches 6, 8 are controlled to sample the output signals from a preceding pipeline stage and then pass those output signals as the input signals to the next pipeline stage under the control of a shared clock signal clk. This clock signal is distributed within the integrated circuit 2 so as to synchronize the operation of the various processing circuitry elements and latches. This type of pipelined processing within an integrated circuit 2 will be familiar to those within this technical field.

Figure 2:
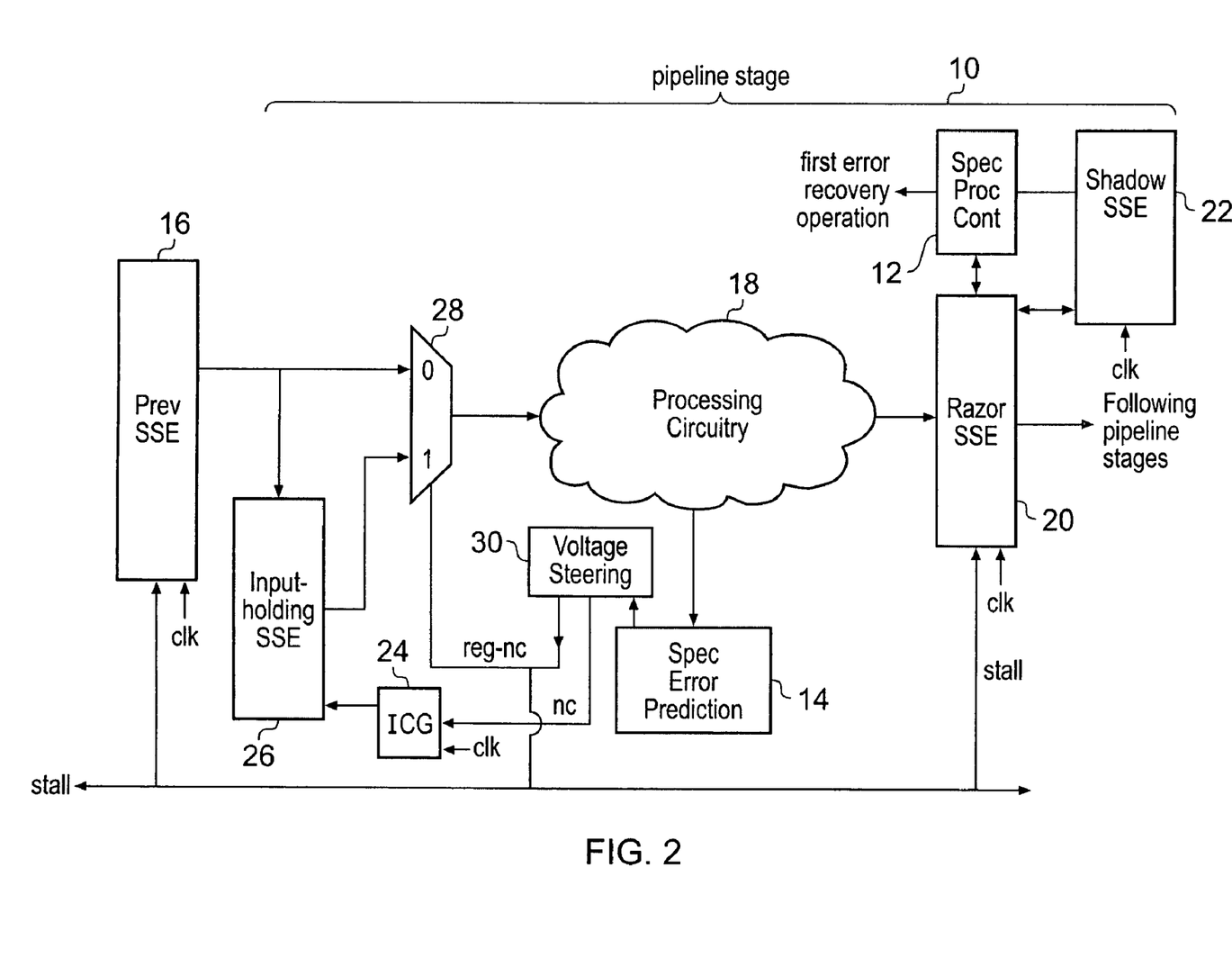
FIG. 2 schematically illustrates a pipeline stage including speculative processing control circuitry and speculative error prediction circuitry.

FIG. 2 illustrates a pipeline stage 10 incorporating both speculative processing control circuitry 12 and speculative error detecting circuitry 14. At a broad level, signals are captured within an input sequential storage element 16 as output signals from a previous stage and then applied as input signals to the processing circuitry 18 of the pipeline stage 10. The output signals from the processing circuitry 18 are captured by an output sequential storage element 20 and passed to a following pipeline stage(s) for use as input signals to that following pipeline stage(s). In this example embodiment, a shadow sequential storage element 22 is associated with the output sequential storage element 20 and serves to capture the output signals from the processing circuitry 18 at a time following the time at which values of those same signals are captured by the output sequential storage element 20. The capture by the shadow sequential storage element 22 at this later time permits additional processing time for the processing circuitry 18 to generate the correct output signal values and accordingly the values which are captured in the shadow sequential storage element 22 are taken as correct. The speculative processing control circuitry 12 compares the values within the shadow sequential storage element 22 with those in the output sequential storage element 20 with any difference therebetween indicating and being deemed to be a determination of the occurrence of an error. The speculative processing control circuitry can then initiate a first error recovery operation.

This first error recovery operation takes the form of a pipeline flush applied to the pipeline stage 10, upstream pipeline stages and the immediately following pipeline stage which will have commenced processing operations based upon incorrect signal values as output from the output sequential storage element 20. The flushing and subsequent reloading of the pipeline as part of this first error recovery operation represents a significant performance penalty. The correct values stored within the shadow sequential storage element 22 can be reloaded into the output sequential storage element 20 as part of this first error recovery operation in order to try to reduce the reload time.

It will be appreciated that the speculative processing control circuitry 12, the output sequential storage element 20 and the shadow sequential storage element 22 together provide the speculative processing operations supported by the pipeline stage of FIG. 2. The use of a shadow sequential storage element 22 is only one option for the provision of the latch structures for supporting this speculative processing. Other forms of latch are possible and one example of this is described in US Published Patent Application No. 2007-0162798.

Also provided within the pipeline stage 10 is the speculative error prediction circuitry 14. This speculative error prediction circuitry 14 serves to generate a prediction as to whether or not an error will occur in the value of output signal being generated by the processing circuitry 18 at the time of capture prior to that output signal value actually being captured within the output sequential storage element 20 (at the rising edge of the clock signal in this example embodiment). This prediction is supplied to voltage steering circuitry 30 which generates a not complete signal nc indicating that the processing being performed by the processing circuitry 18 will be not complete at the rising edge of the clock signal.

There are a variety of different forms which the speculative error prediction circuitry 14 may take. It is possible to use self-timing techniques whereby the speculative error prediction circuitry 14 seeks to model the processing delay of the processing circuitry 18 and predict an error if this delay indicates that processing will not be complete by the rising edge of the clock. Other speculative error prediction techniques can take a very different form, such as monitoring the current being consumed by the processing circuitry 18 based upon the observation that the current consumed reduces when the processing is complete and accordingly if the current being consumed is too high at a predetermined time prior to the rising edge of the clock signal, then this will indicate that the processing will not be complete by that rising edge and accordingly an error can be predicted. Other examples of speculative error prediction circuitry are known from publications such as "Self-Timed Logic Using Current-Sensing Completion Detection" by M. E. Dean, D. L. Dill and M. Horowitz in International Conference on Computer Design, 1994 and "Activity-Monitoring Completion-Detection (AMCD): A New Single Rail Approach to Achieve Self-Timing" by E. Grass, R. C. S Morling and I. Kale in Second International Symposium on Advanced Research In Asynchronous Circuits and Systems (ASYNC '96), 1996. These and other speculative error detecting techniques may also be used.

It will be appreciated that since the speculative error prediction circuitry 14 need not guarantee the accuracy of its predictions and some false positives can be tolerated with an overall advantage nevertheless being achieved, the form of the speculative error prediction circuitry 14 can be simplified and accordingly represent a relatively low additional circuit overhead associated with the pipeline stage 10.

The speculative error prediction circuitry 14 and voltage steering circuitry 30 produce a not complete signal nc when this prediction is made and a registered version of this not complete signal reg_nc which is asserted starting at the following rising edge of the clock signal clk and lasting for two clock periods thereafter. The immediately produced not complete signal nc is used to control a clock gating circuit 24 such that an input-holding sequential storage element 26 is only clocked to store the input signals from the input sequential storage element 16 when an error is predicted. The registered version of the not complete signal reg_nc is used to switch a multiplexer 28 to select as inputs to the processing circuitry 18 the signals stored within the input-holding sequential storage element 26 rather than those from the input sequential storage element 16 in the two cycles following the prediction of an error. This holding for two clock cycles of the input signal values to the processing circuitry 18 permits the processing circuitry 18 sufficient time for the output signals from the processing circuitry 18 to settle to correct values. Furthermore, as the input signals are being applied from the input-holding sequential storage element 26, the input sequential storage element 16 is available to capture the output signals from the preceding pipeline stage which have been correctly generated. The registered not complete signal reg_nc is used to stall the current pipeline stage 10 in which the error is occurring and the upstream pipeline stages for the two clock cycles for which the registered not complete signals reg_nc is held. The flushing of the upstream pipeline stages is therefore avoided. The following pipeline stage has bubbles inserted for these two clock cycles (i.e. can be "bubbled") as the input signals it would be expecting in the clock cycle following that in which the error occurred would not be available within the output sequential storage element 20. However, the pipeline stages downstream of the pipeline stage immediately following the pipeline stage 10 can continue to be clocked as they will have their proper input signals and can properly generate correct output signals.

It will be appreciated from the above that the second error recovery operation, which in this example embodiment comprising the stalling of the pipeline stages as outlined above and the reapplication of the input signals to the processing circuitry 18 over two processing cycles, has a lower performance penalty associated with it than the first error recovery operation, which comprises the flushing and refilling of the upstream pipeline.

The voltage steering circuitry 30 by its control of the pipeline activity serves to steer a metastable signal value within the processing logic 18 to either a logic "1" signal value or a logic "0" signal value. It effectively reinterprets the signal value so as to form a proper logic "1" or logic "0" signal value. The voltage steering circuitry 30 can be similar to that described in the Published Patent US-2007-0103995. The disclosure concerning the form of the voltage steering circuitry 30 given in this publication is incorporated herein by reference.

Figure 3:
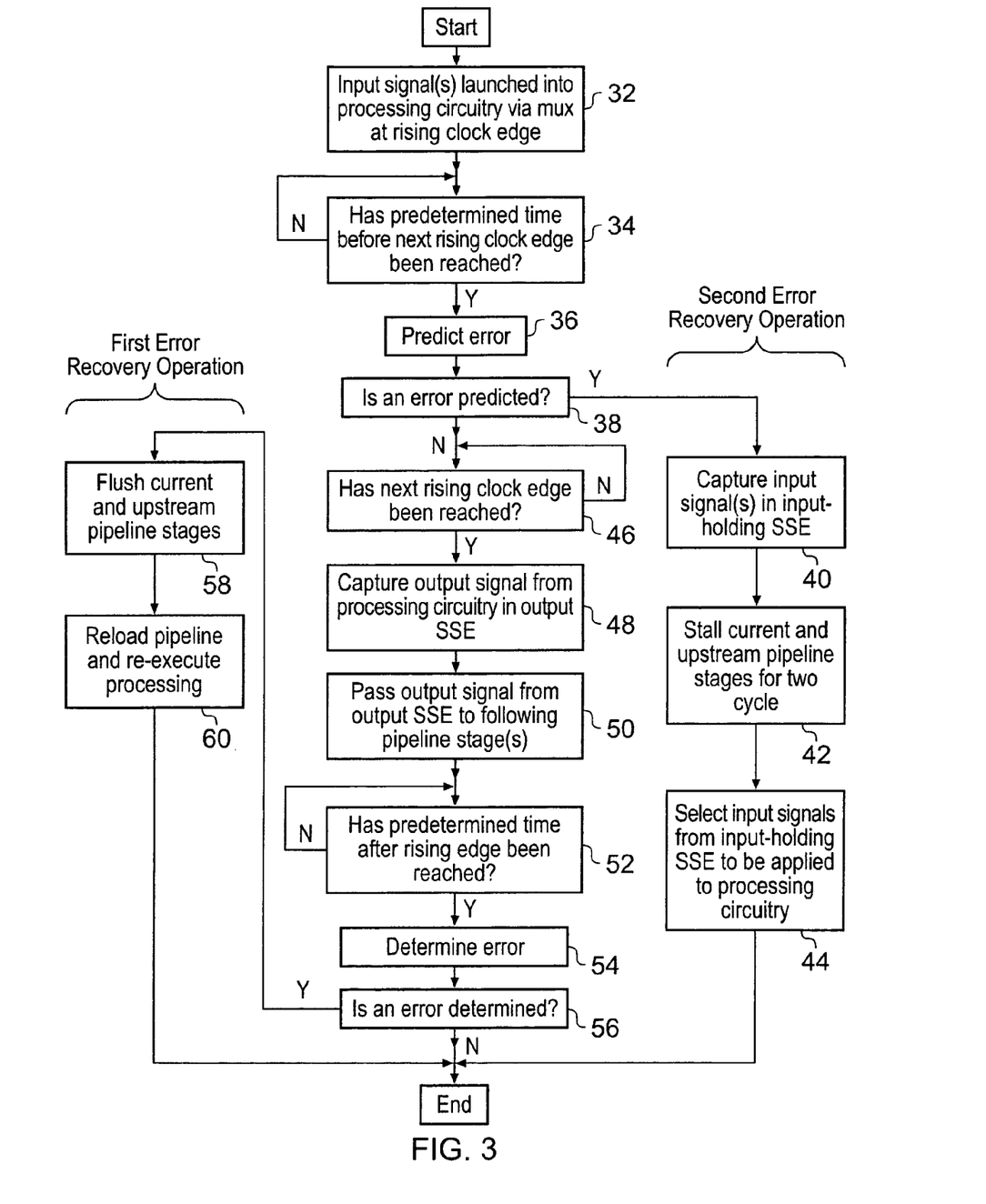
FIG. 3 is a flow diagram schematically illustrating the control of the pipeline stage of FIG. 2 to perform either a first error recovery operation or a second error recovery operation.

FIG. 3 is a flow diagram schematically illustrating the operation of the pipeline stage 10. At step 32 input signals are launched into the processing circuitry 18 via the multiplexer 28 at the rising edge of a clock signal which defines the start of a processing cycle. Step 34 waits until a predetermined time before the next rising edge of the clock signal has been reached. This predetermined time is the time at which the speculative error detector 14 makes its prediction regarding whether or not an error will occur within values captured for the output signals of the processing circuitry 18. This time corresponds to the third time as will be discussed in relation to FIG. 4. At step 36, the speculative error detecting circuitry 14 makes its prediction as to whether or not an error will occur within the output signals of the processing circuitry 18 and asserts an appropriate value upon the not complete nc signal line. As previously discussed, the speculative error detecting circuitry 14 could make this prediction using a variety of different techniques (e.g. self timing, current consumption, transition detection etc) and these various techniques will be apparent to those in this technical field.

Step 38 determines whether or not an error has been predicted at step 36. If an error has been predicted, then the second error recovery operation is initiated as shown in steps 40, 42 and 44. Step 40 captures the input signals from the input sequential storage element 16 into the input-holding sequential storage element 26. Step 42 stalls the current and upstream stages for two processing cycles while the immediately following pipeline stage has processing bubbles inserted. This is achieved by the registered not complete signal reg_nc being asserted for two clock cycles. During this stalling of the pipeline stage 10, step 44 selects the signals from the input-holding sequential storage element 26 via the multiplexer 28 to be applied to the processing circuitry 18. When the stall condition has expired, then clocking of the current and upstream pipeline stages can resume. During the two cycles of stall, the processing circuitry 18 will have had sufficient time to correctly output its output signals.

If the determination at step 38 was that an error has not been predicted, then processing proceeds to step 46 at which the system waits until the next rising clock edge has been reached. This rising clock edge triggers capture of the output signal from the processing circuitry 18 within the output sequential storage element 20 at step 48. This capture at the rising edge would be the normal non-erring operation of the pipeline stage 10 and would be the expected behavior in most cases. This rising edge of the clock signal corresponds to the first time as will be discussed later in connection with FIG. 4.

At step 50, the output signal from the output sequential storage element 20 is applied to the following pipeline stage(s). This is allowing speculative processing to proceed since it has not yet determined whether or not that output signal is correct. At step 52, the processing waits until a predetermined time after the rising edge has been reached. This corresponds to the second time as will be discussed in relation to FIG. 4. This second time may conveniently be a half clock cycle following the first time (rising clock edge). This additional half cycle of speculation permits sufficient time for the processing circuitry 18 to correctly generate its output signal with a high degree of accuracy. Accordingly, once this time has been reached, processing proceeds to step 54 at which a determination can be made as to whether or not the output signal captured at step 48 was correct and whether the subsequent speculative processing in the following pipeline stages has been based upon correct input signals to those stages. Once this determination has been made, step 56 serves to trigger a first error recovery operation comprising steps 58 and 60 if it has been determined that the output signal was in error. If there was no determination of an error, then the processing which was speculatively performed following step 48 is allowed to continue.

The first error recovery operation comprises flushing the current and upstream pipeline stages at step 58. The next pipeline stage will have started processing based upon incorrect input signals and this processing will be suppressed. The current and upstream pipeline stages will have been clocked on from their state in which the error occurred and accordingly will require flushing and reloading in order to permit the incorrectly evaluated output signal value to be re-evaluated. This reloading and re-executing takes place at step 60. It will be appreciated that the first error recovery operation comprising steps 58 and 60 takes significantly longer to complete than the second error recovery operation comprising steps 40, 42 and 44. A factor in this is that the deep pipeline lengths associated with high performance processors will mean that the reloading and re-execution processing of step 60 will take many clock cycles. This is contrasted by the stall for two clock cycles associated with the second error recovery operation at step 42.

In many cases when an error could be determined at step 54, it will be the case that such an error can and will be predicted at step 36. When such an error is predicted at step 36, then it can be corrected by the second error recovery operation at a lesser performance penalty than would have been the case if it had been allowed to propagate its results to following pipeline stages and to allow the upstream pipeline stages to change their states. It will be appreciated that in some cases a false positive will arise and an error will be predicted at step 36 which step 54 would have determined not to have occurred. In this case an unnecessary two cycles of stall will be introduced by the second error recovery operation. However, the performance loss associated with these false positives is significantly less than the performance gain associated with avoiding the first error recovery operation in the large number of cases where an error can be correctly predicted at step 36 and the first error recovery operation avoided.

FIG. 3 shows the control flow as sequential, but it will be understood by those in this field that this is only a representation and at least some of these steps can be performed independently and/or in parallel.

Figure 4:
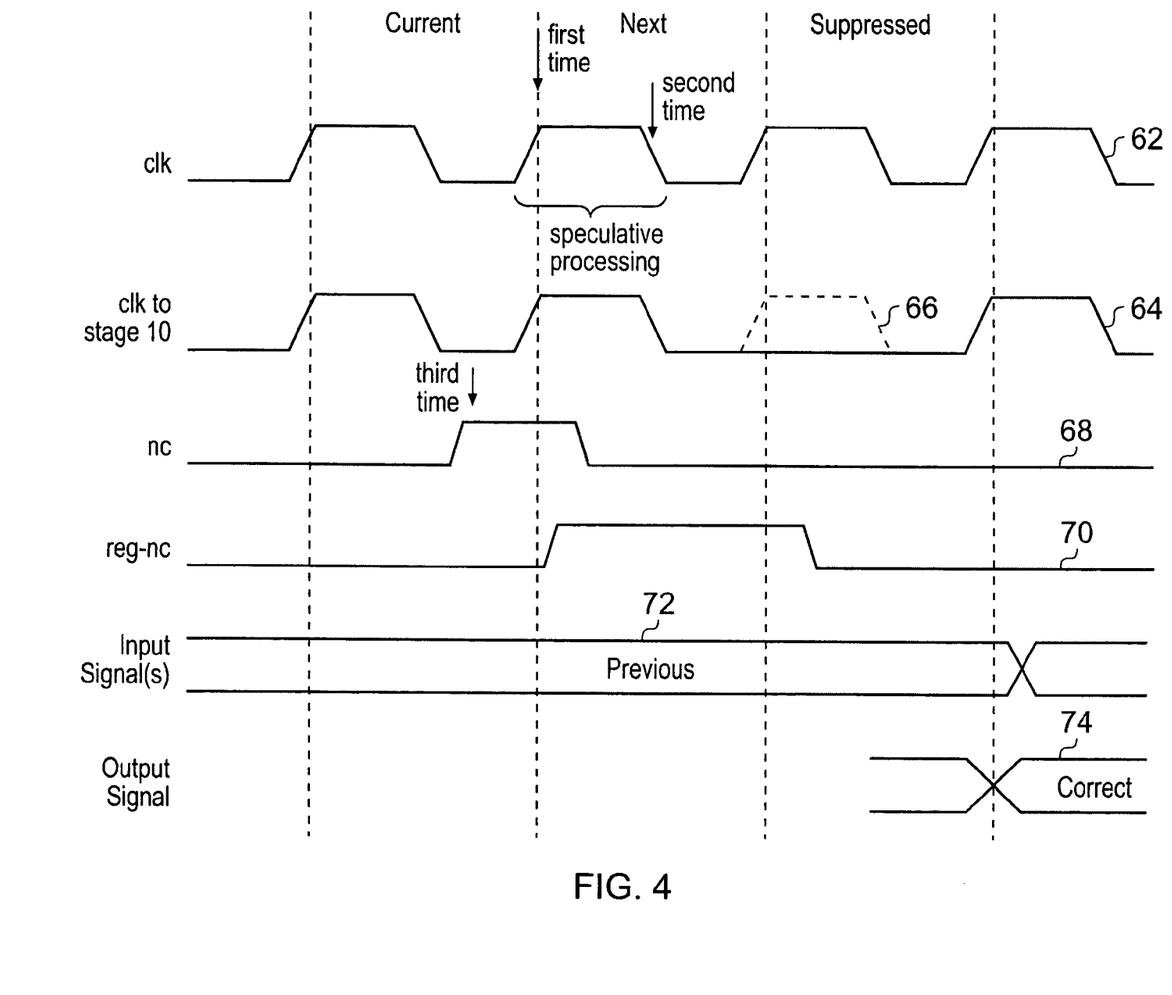
FIG. 4 is a signal timing diagram illustrating the relative timing of some of the control signals within the circuit of FIG. 2.

FIG. 4 is a timing diagram illustrating various signals within the pipeline stage 10 of FIG. 2. Signal 62 represents the overall clock signal to the integrated circuit 2 which synchronizes the operation of the plurality of pipeline stages therein. Signal 64 is the clock signal applied to pipeline stage 10, which is performing both speculative processing and speculative error prediction. This gated clock signal, which includes a suppressed clock cycle 66, is also applied to the upstream pipeline stages and the next pipeline stage as part of the second error recovery operation in which these other pipeline stages are also stalled. As shown in FIG. 4, the first time corresponds to the rising edge of the clock signal 62 and is the point at which the output sequential storage element 20 and the input sequential storage element 16 are normally clocked and capture their respective input signals and start to generate their new respective output signals. In the half clock cycle following this first time, speculative processing is performed based upon the assumption that the signals captured and now being output are correct. The speculative processing control circuitry 12, which in this example co-operates with the shadow sequential storage element 22, is used to determine if an error has actually occurred at the second time corresponding to the falling edge of the clock signal. If an error has occurred, then the first error recovery operation will be triggered. It will be appreciated that this speculative processing control and the output sequential storage element 20 can have a variety of different forms.

Signal 68 is a not complete signal nc generated by the speculative error detecting circuitry 14. This speculative error detecting circuitry 14 performs its prediction as to whether or not an error will arise at a third time which precedes the first time illustrated in the clock signal 62. In the example shown in FIG. 4, at this third time an error is predicted and accordingly the not complete signal nc is asserted. This not complete signal nc is used to trigger the input-holding sequential storage element 26 to capture the currently applied input signals to the processing circuitry 18 such that these can be maintained during the second error recovery operation. The signal 70 shown in FIG. 4 is a registered not complete signal reg_nc. This captures at the rising clock edge whether or not the not complete signal currently being asserted by the speculative error detecting circuitry 14 and if it is being asserted, then results in the registered not complete signal reg_nc being asserted for one clock cycle. The register not complete signal reg_nc controls the multiplexer 28 to select as inputs to the processing circuitry 18 the previous input signals 72 as held within the input-holding sequential storage element 26. The registered not complete signal reg_nc is also used to stall the current and upstream pipeline stages for the two clock cycle period. At the end of this two clock cycle period, the processing circuitry 18 will have had sufficient time to generate the correct output signals 74 which can be captured by the output sequential storage element 20 and then passed to the next processing stage as that resumes processing.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
    processing circuitry responsive to one or more input signal values to generate an output signal in dependence thereupon;
    speculative processing control circuitry coupled to said processing circuitry and configured to permit speculative processing based upon a value of said output prior to confirmation that said value is correct, subsequently to generate a determination of whether said value is incorrect and, if said determination indicates that said value has been determined to be incorrect, then to initiate a first error recovery operation; and
    speculative error prediction circuitry coupled to said processing circuitry to generate a prediction of whether said value is incorrect prior to generation of said determination by said speculative processing control circuitry and, if said prediction indicates that said value is predicted to be incorrect, then to initiate a second error recovery operation, said second error recovery operation having a lesser performance penalty than said first error recovery operation.

2. An integrated circuit as claimed in claim 1, wherein said processing circuitry comprises a plurality of pipeline stages.

3. An integrated circuit as claimed in claim 2, wherein said first error recovery operation comprises an at least partial flush of said plurality of pipeline stages.

4. An integrated circuit as claimed in claim 3, wherein said at least partial flush flushes those pipeline stages upstream and including an erring pipeline stage generating said value that is incorrect.

5. An integrated circuit as claimed in claim 2, wherein said second error recovery operation comprises stalling those pipeline stages upstream of an erring pipeline stage generating said value that is incorrect to permit correction of said value within said erring pipeline stage.

6. An integrated circuit as claimed in claim 2, wherein said processing circuitry is responsive to a clock signal to synchronize operation of different portions of said processing circuitry and at least one of said pipeline stages comprises:
    said processing circuitry;
    an output sequential storage element coupled to said processing circuitry and responsive to said clock signal to capture said value of said output signal generated by said processing circuitry at a first time and to pass said value as an input signal to one or more following pipeline stages; wherein said speculative processing control circuitry is coupled to said sequential storage element to generate said determination at a second time that is later than said first and is responsive to said determination indicating that said value is incorrect to trigger said first error recovery operation to repair incorrect further processing in said plurality of pipeline stages based upon said value that is determined as incorrect; and said speculative error detecting circuitry is responsive to one or more signals within said processing stage to generate said prediction at a third time that is before said first time and is responsive to said prediction indicating that said value will be incorrect to trigger said second error recovery operation to prevent further processing in said plurality of pipeline stages based upon said value that is predicted to be incorrect.

7. An integrated circuit as claimed in claim 6, further comprising an input-holding sequential storage element coupled to said one or more input signals and responsive to said prediction indicating that said value will be incorrect to store said one or more input signals such that said input-holding sequential storage element applies said one or more input signals to said processing logic during said second error correction operation.

8. An integrated circuit as claimed in claim 7, wherein a multiplexer switched in dependence upon said prediction is connected to apply either said one or more input signals from said input-holding sequential storage element or one or more inputs from a preceding pipeline stage to said processing circuitry.

9. An integrated circuit as claimed in claim 7, wherein said input-holding sequential storage element is not triggered to store said one or more input signals unless said prediction indicates that said value will be incorrect.

10. An integrated circuit as claimed in claim 6, further comprising a shadow sequential storage element coupled to said processing logic and triggered to store a correct value of said output signal at said second time, values within said output sequential storage element and said shadow sequential storage element being compared to make said determination.

11. An integrated circuit as claimed in claim 10, wherein said shadow sequential storage element loads said correct value of said output signal to said output sequential storage element during said second error recovery operation.

12. An integrated circuit said claimed in claim 10, wherein said shadow sequential storage element loads said correct value of said output signal to said output sequential storage element during said second error recovery operation and said shadow sequential storage element loads said correct value of said output signal to output sequential storage element during said first error recovery operation.

13. An integrated circuit as claimed in claim 6, wherein said processing stage further comprises voltage steering circuitry coupled to said processing circuitry and responsive to said speculative error prediction circuitry to act to steer a metastable value to a stable signal value in dependence upon said prediction.

14. An integrated circuit as claimed in claim 1, wherein said processing circuitry is responsive to a clock signal to synchronize operation of different portions of said processing circuitry.

15. An integrated circuit as claimed in claim 1, wherein one or more operational parameters of said integrated circuit is varied in dependence upon at least one of said determination and said prediction.

16. An integrated circuit as claimed in claim 15, wherein said one or more operations parameters include one or more of an operating voltage and an operating frequency.

17. A method of operating an integrated circuit, said method comprising the steps of:
  in response to one or more input signal values generating with processing circuitry an output signal in dependence thereupon;
  performing speculative processing control of said processing circuitry to permit speculative processing based upon a value of said output prior to confirmation that said value is correct, subsequently to generate a determination of whether said value is incorrect and, if said determination indicates that said value has been determined to be incorrect, then to initiate a first error recovery operation; and
  performing speculative error prediction for said processing circuitry to generate a prediction of whether said value is incorrect prior to generation of said determination by said speculative processing control circuitry and, if said prediction indicates that said value is predicted to be incorrect, then to initiate a second error recovery operation, said second error recovery operation having a lesser performance penalty than said first error recovery operation.

18. A method as claimed in claim 17, wherein said processing circuitry comprises a plurality of pipeline stages.

19. A method as claimed in claim 18, wherein said first error recovery operation comprises an at least partial flush of said plurality of pipeline stages.

20. A method as claimed in claim 19, wherein said at least partial flush flushes those pipeline stages upstream and including an erring pipeline stage generating said value that is incorrect.

21. A method as claimed in any claim 18, wherein said second error recovery operation comprises stalling those pipeline stages upstream of an erring pipeline stage generating said value that is incorrect to permit correction of said value within said erring pipeline stage.

22. A method as claimed in claim 18, wherein at least one of said pipeline stages comprises said processing circuitry and an output sequential storage element coupled to said processing circuitry, said method further comprising the steps of:
  in response to said clock signal, capturing said value of said output signal generated by said processing circuitry at a first time and passing said value as an input signal to one or more following pipeline stages;
  generating said determination at a second time that is later than said first and, in response to said determination indicating that said value is incorrect triggering said first error recovery operation to repair incorrect further processing in said plurality of pipeline stages based upon said value that is determined as incorrect; and
  in response to one or more signals within said processing stage, generating said prediction at a third time that is before said first time and, in response to said prediction indicating that said value will be incorrect, triggering said second error recovery operation to prevent further processing in said plurality of pipeline stages based upon said value that is predicted to be incorrect.

23. A method as claimed in claim 22, further comprising in response to said prediction indicating that said value will be incorrect, storing said one or more input signals within an input-holding sequential storage element and applying said one or more input signals stored within said input-holding sequential storage element to said processing logic during said second error correction operation.

24. A method as claimed in claim 23, further comprising switching a multiplexer in dependence upon said prediction to apply either said one or more input signals from said input-holding sequential storage element or one or more inputs from a preceding pipeline stage to said processing circuitry.

25. A method as claimed in claim 23, wherein said input-holding sequential storage element is not triggered to store said one or more input signals unless said prediction indicates that said value will be incorrect.

26. A method as claimed in claim 22, further comprising storing a correct value of said output signal at said second time in a shadow sequential storage element coupled to said processing logic, values within said output sequential storage element and said shadow sequential storage element being compared to make said determination.

27. A method as claimed in claim 26, wherein said shadow sequential storage element loads said correct value of said output signal to said output sequential storage element during said second error recovery operation.

28. A method said claimed in claim 26, wherein said shadow sequential storage element loads said correct value of said output signal to output sequential storage element during said first error recovery operation.

29. A method as claimed in claim 22, further comprising in response to said speculative error prediction, steering a meta-stable signal value to a stable signal value using voltage steering circuitry within said processing stage and coupled to said processing circuitry.

30. A method as claimed in claim 17, wherein said processing circuitry is responsive to a clock signal to synchronize operation of different portions of said processing circuitry.

31. A method as claimed in claim 17, wherein one or more operational parameters of said integrated circuit is varied in dependence upon at least one of said determination and said prediction.

32. A method as claimed in claim 31, wherein said one or more operations parameters include one or more of an operating voltage and an operating frequency.

33. An integrated circuit comprising:
processing means for generating an output signal in dependence upon one or more input signal values;
speculative processing control means coupled to said processing circuitry for permitting speculative processing based upon a value of said output prior to confirmation that said value is correct, subsequently for generating a determination of whether said value is incorrect and, if said determination indicates that said value has been determined to be incorrect, then for initiating a first error recovery operation; and
speculative error prediction means coupled to said processing circuitry for generating a prediction of whether said value is incorrect prior to generation of said determination by said speculative processing control circuitry and, if said prediction indicates that said value is predicted to be incorrect, then for initiating a second error recovery operation, said second error recovery operation having a lesser performance penalty than said first error recovery operation.

* * * * *